United States Patent
Scheunis et al.

(10) Patent No.: US 11,926,884 B2
(45) Date of Patent: Mar. 12, 2024

(54) PYROMETALLURGICAL PROCESS FOR RECOVERING NICKEL, MANGANESE, AND COBALT

(71) Applicant: UMICORE, Brussels (BE)

(72) Inventors: Lennart Scheunis, Olen (BE); Isabel Vermeulen, Olen (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 17/779,782

(22) PCT Filed: Nov. 27, 2019

(86) PCT No.: PCT/EP2019/082758
§ 371 (c)(1),
(2) Date: May 25, 2022

(87) PCT Pub. No.: WO2021/104620
PCT Pub. Date: Jun. 3, 2021

(65) Prior Publication Data
US 2023/0002856 A1    Jan. 5, 2023

(51) Int. Cl.
| C22C 1/02 | (2006.01) |
| C22C 22/00 | (2006.01) |
| C22C 33/04 | (2006.01) |

(52) U.S. Cl.
CPC ............... *C22C 1/02* (2013.01); *C22C 22/00* (2013.01); *C22C 33/04* (2013.01)

(58) Field of Classification Search
CPC ............ C22C 1/02; C22C 22/00; C22C 33/04
See application file for complete search history.

(56) References Cited

U.S. PATENT DOCUMENTS

2012/0073406 A1    3/2012   Ki et al.

FOREIGN PATENT DOCUMENTS

| CN | 107012332 A | 8/2017 |
| EP | 2418043 A1 | 2/2012 |
| EP | 3112492 A | 1/2017 |
| EP | 3269832 A1 | 1/2018 |
| JP | 2006161079 A | 6/2006 |
| JP | 2012528783 A | 11/2012 |
| WO | 2009100495 A1 | 8/2009 |
| WO | 2010117074 A1 | 10/2010 |
| WO | 2011035915 A1 | 3/2011 |

OTHER PUBLICATIONS

Marcus Sommerfeld et.al. "Zero-Waste": A Sustainable Approach on Pyrometallurgical Processing of Manganese Nodule Slags Minerals 2018, 8, 544 (Year: 2018).*
Shen Jianzhong et.al. [Machine translation of CN111996377A] (Year: 2020).*
ISA/EP; International Search Report and Written Opinion for International Patent Application No. PCT/EP2019/082758 dated May 19, 2020, 12 pages.
Ding, Weizhong, et al., "Manganese and Silicon Distribution between Slag and Metal in Silicomanganese Production", Sep. 30, 2000.
Elwert, T., et al., "Phase composition of high lithium slags from the recycling of lithium ion batteries", World of Metallurgy—Erzmetall, vol. 65, No. 3, May 1, 2012, 10 pages.
JPO; Office Action from Corresponding JP Patent Application No. 2022-530963, dated Dec. 11, 2023, 4 pages, translation.

* cited by examiner

*Primary Examiner* — Brian D Walck
*Assistant Examiner* — Nazmun Nahar Shams
(74) *Attorney, Agent, or Firm* — NK Patent Law

(57) ABSTRACT

A 2-step high temperature process for recovering Ni, Co, and Mn from various sources comprises preparing a metallurgical charge comprising materials containing Ni, Co, and Mn, and Si, Al, Ca and Mg as slag formers; smelting the charge with slag formers in first reducing conditions, thereby obtaining a Ni—Co alloy comprising a major part of at least one of Co and Ni, with Si<0.1%, and a first slag comprising the major part of the Mn; separation of the first slag from the alloy; and, smelting the first slag in second reducing conditions, more reducing than said first reducing conditions, thereby obtaining a Si—Mn alloy comprising the major part of the Mn, with Si>10%, and a second slag. A Ni—Co alloy is produced, and a Si—Mn alloy is produced. The second slag is essentially free of heavy metals and therefore suitable for reuse.

3 Claims, No Drawings

PYROMETALLURGICAL PROCESS FOR RECOVERING NICKEL, MANGANESE, AND COBALT

CROSS-REFERENCE TO RELATED APPLICATION

This application is a U.S. National Stage application of International Patent Application No. PCT/EP2019/082758, filed on Nov. 27, 2019.

The present disclosure concerns a 2-step high temperature process for the recovering Ni, Co, and Mn from various sources. A Ni—Co alloy is produced, suitable for e.g. the preparation of cathode material for Li-ion batteries, and a Si—Mn alloy is produced, which can be used in steelmaking.

In recent years electric vehicles have seen an unprecedented growth, driven by new legislation in Europe and China designed to gradually reduce the $CO_2$ footprint of the car fleet and to limit the air pollution in cities. This growth is expected to continue during the next decades. The adaptation of electric vehicles depends on the performance of the batteries used to store the electric energy. To obtain the highest energy density while keeping the cost under control, Li-ion batteries are used. The preferred batteries contain cathodes based on the transition metals Ni, Mn, and Co (aka NMC batteries). With the growth of the electric mobility market, also the demand for these metals is expected to increase significantly.

The demand in Ni and Co may surpass the worldwide production capacity. Co is particularly critical as it is today only produced as a byproduct of the Ni and Cu industry. The Ni market is significantly larger than the Co market, but most of the Ni is going into the production of stainless steel, for which the purity is relatively unimportant. High purity Ni and Co metals or compounds are therefore in short supply. In view of the above, the recovering Ni and Co from end-of-life batteries, ideally already containing the right combination of these elements, is an attractive proposal.

EP3269832 describes a method of recycling and processing a waste battery, aiming at a Co and/or Ni containing alloy and a Mn-containing slag, characterized as MnO—$SiO_2$—$Al_2O_3$ ternary smelting slag. CN107012332 describes a synergetic metal recycling method for nickel and cobalt containing waste batteries and copper containing electronic waste. WO2011035915 describes an autogenous high temperature process for the treatment of lithium ion batteries producing a slag and a C-, Ni-, and Cu-containing alloy. The process can be used for most other feeds as long as they contain Mn, and Ni and/or Co. A further example is spent Co—Fe—Mn/γ—$Al_2O_3$ Fischer-Tropsch catalyst.

Feeds also containing Mg are particularly suitable as this element is desired in the slag. Most feeds other than batteries cannot be treated autogenously but instead require additional energy to melt the feeds. This can be supplied by a natural gas oxygen burner, or by electrical heating. An example of a process suitable for Ni-rich feeds is given in WO2009100495, wherein a bath smelting process is used to produce a molten Ni alloy and a slag.

Depending on the feed, a Ni—Co alloy can be obtained, rich in Co and/or in Ni. Such an alloy is well adapted for further treatment, e.g. using known hydrometallurgy processes, to separate and refine the metals. The obtained highly purified metals or metal compounds are then suitable for the manufacture of cathode material for Li ion batteries.

Pyrometallurgy processes generally produce an alloy and a slag. Clean slags, i.e. slags with a low leachable metal content, are typically used in the construction industry. Examples include: synthetic aggregates in concrete, replacing sand or other mined minerals and high-density ballast, for example in underwater applications like dyke reinforcements.

When the feed contains Co and/or Ni, the slag will likely contain small yet appreciable amounts of these elements. For example, Elwert et al. (World of Metallurgy-Erzmetall, GDMB-Medienverlag, Clausthal-Zellerfeld, Vol. 65, no. 3, 163-171, 2012) discuss three isolated slags and their phase compositions with the target to develop a process for lithium recovery. In Europe, the Classification, Labelling and Packaging (CLP) legislation EC N° 1272/2008 requires the labeling of all slags with more than 0.1% of either one of Ni and Co as a possibly hazardous material. It then requires the end users of the material to perform a risk analysis: this will however impair or even prohibit the reuse of such slags in most known applications.

It is possible to further decrease the total of the Ni and Co content of slags to below 0.1% by increasing the level of reduction. However, under these conditions, some of the silica in the slag will also partially get reduced to the metallic form and report to the alloy. This metallic Si seriously complexifies downstream processing. Indeed, the first steps in the hydrometallurgy alloy processing normally comprise acid leaching and filtration; the presence of Si is known to interfere seriously with the filtration. Ding et al. (ISIJ International, 40, no. 9, 850-856, 2000) report some general laboratory measurements to investigate the equilibrium distribution of manganese and silicon between slag and metal in silicomanganese production.

The additional recovery of Mn in the Ni—Co alloy, while technically possible, would require even stronger reducing conditions. This is not recommended as the obtained Ni—Co—Mn alloy would be greatly contaminated with metallic Si, again interfering with the subsequent hydrometallurgy separation and purification steps.

The current invention provides a solution for at least one of the above-mentioned problems by providing a process for the production of Si—Mn alloy, as described in claim 1.

The method described in this disclosure consists of a two-step process. The process aims at the recovery of Ni, Mn, and Co, while avoiding issues due to the presence of Si in the Ni—Co alloy; the final slag moreover complies with the aforementioned CLP legislation.

Ni and Co are recovered in a first alloy essentially free of Si. Pure Ni and Co can economically be prepared from such an alloy, according to known refining techniques. These metals are, as already mentioned, in high demand for the manufacture of Li-ion batteries.

Mn is recovered in a second alloy, together with part of the Si. This Si—Mn alloy is suitable for use in the steel industry. Any Ni and Co in this alloy is lost for high purity applications, but will still be considered useful in steel.

The process comprises the steps of:
a) preparing a metallurgical charge comprising Ni-, Mn-, and Co-bearing materials, and Si, Al, Ca, and Mg as slag formers;
b) smelting said metallurgical charge in first reducing conditions, thereby obtaining a Ni—Co alloy comprising a major part of at least one of Co and Ni, with Si<0.1%, and a first slag comprising the major part of the Mn;
c) separation of the slag from the alloy; and,
d) smelting the slag in second reducing conditions, more reducing than said first reducing conditions, thereby obtaining a Si—Mn alloy comprising the major part of the Mn, with Si>10%, preferably Si>15%, and a second slag.

"Si, Al, Ca, and Mg as slag formers" may e.g. correspond to the addition of metals as such, or to compounds such as oxides, hydroxides, or salts, or to a mixture of these compounds. Si and Ca are typically added as $SiO_2$ and CaO. Al could be added as $Al_2O_3$, but may also originate from the Ni-, Mn-, and Co-bearing materials wherein it could be present in metallic form. Mg could be added as MgO, but may also originate from the Ni-, Mn-, and Co-bearing materials wherein it could be present e.g. as oxide, hydroxide, or salt.

"Major part" indicates that more than 50% of an element or compound is designated. This percentage refers to the weight of said element or compound entering the process.

All percentages are expressed as weight %.

In the first reduction smelting, wherein mildly reducing conditions are maintained, the major part of the Ni and Co reports to a first alloy, a minor part reporting to a first slag. This Ni—Co alloy remains essentially Si-free, i.e. having less than 0.1% Si, and is therefore relatively straightforward to process. The skilled person will easily be able to control the degree of reduction by dosing reducing agents such as coal or natural gas, guided by the observed behavior of Mn, Ni, Co, and Si. The preferred degree of reduction can be expressed in terms of a $pO_2$ between $10^{-9}$ and $10^{-11}$ atm. Insufficient reducing conditions will result in low Ni and Co yields in the alloy.

Overly reducing conditions will result in too much Si in the alloy, and in a too low Mn yield in the slag.

The first slag is then separated and subjected to a second reduction smelting step.

In the second reduction smelting, wherein more reducing conditions are maintained than in the first reduction smelting, the major part of the Mn reports to a second alloy, as well as part of the Si, resulting in an Mn- and Si-bearing alloy with more than 10% Si. A second slag is formed, which will be essentially free of heavy metals and therefore suitable for re-use. The skilled person will easily be able to control the degree of reduction by dosing reducing agents such as coal or natural gas, guided by the observed behavior of Mn, and Si. The preferred degree of reduction can be expressed in terms of a $pO_2$ lower than $10^{-14}$ atm. Insufficient reducing conditions will result in low Mn and Si yields in the alloy. Stronger reducing conditions will have no critical detrimental effect, but might result in an Mn alloy containing an undesirably high amount of Si. A concentration of Si of less than 35% is preferred.

These two reducing steps can be performed in the same furnace operating batch-wise with the intermediate tapping of the Ni—Co alloy, or they can be done in two different furnaces. When performing the process in two furnaces, it is preferred to keep the slag liquid between both reducing steps to avoid re-melting.

In a preferred embodiment, the process generates as first slag according to the composition:
 $0.25 < SiO_2/Al_2O_3 < 2.5$;
 $0.5 < SiO_2/CaO < 2.5$;
 MgO>5%, preferably MgO>10%.
 MnO>2.5%, preferably MnO>5%; and,
 Co+Ni>0.1%, preferably Co+Ni>0.2%, more preferably Co+Ni>0.5%.

The ratios describing the $Al_2O_3$—$SiO_2$—CaO-MgO quaternary system ensure a sufficiently low viscosity of the slag. The MgO content of the slag is preferably higher than 5%, more preferably higher than 10%, to allow for fast decantation of alloy droplets, thereby optimizing the Co and Ni yields in the first step.

The MnO content of the slag is higher than 2.5%, preferably higher than 5%, to ensure a sufficiently rich feed for the production of Si—Mn alloy in the second reduction step.

The slag contains some residual Co and Ni: more than 0.1% of Co plus Ni, preferably more than 0.2%, and more preferably more than 0.5%. A concentration of Co plus Ni of less than 0.1% would be indicative of too strongly reducing conditions in the first step, leading to the reduction of Si. Tolerating somewhat higher levels of Ni plus Co allows for a less critical monitoring of the reduction level. On the other hand, Co plus Ni should preferably remain below 5%, as the yield of these metals to the first alloy could then become unsatisfactory. While Co and Ni in the first slag will be recovered in the Si—Mn alloy, these elements will be lost for high purity applications.

The second slag is essentially free of Co and Ni and complies with the CLP legislation.

In a supplemental process step, the second alloy can be added to an Fe-based molten phase, thereby obtaining a Si—Mn alloyed steel product.

In another embodiment the metallurgical charge according to any previous embodiment comprises (i) Li-ion batteries, (ii) parts of Li-ion batteries, such as cathode materials, and/or (iii) production scrap of said Li-ion batteries. The process is very robust and can deal with all kinds of materials originating from the production of the batteries up to end-of-life batteries themselves (or parts of them).

In another embodiment the Ni—Co alloy obtainable by smelting the metallurgical charge according to any of the previous embodiments can be used for the preparation of a cathode material for Li-ion batteries. Said metallurgical charge is prepared in the first process step of the present invention and smelted in the second process step under specific reduction conditions. Composition of the metallurgical charge and applied reduction conditions influence the content of the resulting first alloy and the resulting first slag.

Another embodiment concerns a slag as such, having the composition according to above-described preferred process embodiment.

In yet another embodiment, the first slag is used for the preparation of a Si—Mn alloy by smelting said slag in reducing conditions.

An example of material containing Ni, Mn, and Co suitable for use in this process is that of Li-ion batteries or related products such as spent batteries, scrapped batteries, and fractionated battery scrap such as cathode material.

Cu may be present in these materials, coming e.g. from the electronics or wiring when feeding battery material. Cu is an easily reduced metal and will essentially report to the first alloy. Small amounts of Cu will however remain in the first slag and end up in the second alloy. Similarly, small amounts of Ni and Co will find their way to the second alloy. Fe, which is not as easily reduced as Cu, will be found in appreciable amounts in the first slag and will get at least partially reduced to the second alloy, together with Mn and Si. Such a second alloy, containing Fe, Mn, Si, as well as small amounts of Cu, Ni, and Co, is well suited for the manufacture of some steels. This is illustrated in EP3112492A. Steel comprising Cu, Ni, and Co show superior sulfide stress cracking and high temperature corrosion resistance compared to classic martensitic stainless steel while at the same time obtaining adequate yield strength of at least 758 MPa. These steels require e.g. the following composition: $0.005\% \leq C < 0.03\%$, $14\% \leq Cr \leq 17\%$, $2.3\% \leq Mo \leq 3.5\%$, $3.2\% \leq Ni \leq 4.5\%$, $Si \leq 0.6\%$, $0.5\% \leq Cu \leq 1.5\%$, $0.4\% \leq Mn \leq 1.3\%$, $0.35\% \leq V \leq 0.6\%$, $3.2 \times C\% \leq Nb \leq 0.1\%$, $W \leq 1.5\%$, $0.5\% \leq Co \leq 1.5\%$, $0.02\% \leq N \leq 0.05\%$, $Ti \leq 0.05\%$, $P \leq 0.03\%$, $S \leq 0.005\%$, and $Al \leq 0.05\%$. For this steel a Si—Mn alloy with substantial amounts of Cu can be used to alloy Mn.

EXAMPLE

Li-ion batteries are shredded prior to loading to the crucible to allow easier mixing. The composition of the batteries is given in Table 1.

TABLE 1

| | Composition in wt. % of the batteries | | | | | | |
|---|---|---|---|---|---|---|---|
| | Al | Mn | Co | Cu | Ni | Li | C |
| Batteries | 10 | 4 | 6 | 9 | 4 | 2.5 | 40 |

A metallurgical charge is prepared consisting of 500 g batteries. 175 g limestone, 100 g silica and 50 g magnesia are added as fluxing agent.

The mixture is added to a boron nitride coated alumina crucible with a volume of 2 L. Prior to adding the mixture, the crucible was filled with 500 g of starting slag and was heated to 1500° C. in an induction furnace. This creates a liquid slag bath to which the feed can be added. The starting slag composition is given in Table 2. Once the starting slag is fully liquid at 1500° C. the metallurgical charge is fed continuously during 2 hours to the crucible. During this time oxygen is blown at a rate of 80 liter/hour above the bath to combust the metallic Al and carbon present in the batteries.

After the final addition, a reducing environment is enforced by blowing a mixture of 120 L/h of CO and 8 L/h $CO_2$ for 1 h into the bath. This results in the establishment of a proper redox potential ($pO_2$).

After this, the melt is decanted for 15 minutes. The good fluidity of the slag allows for an efficient decantation, i.e. without residual alloy droplets floating in the slag. After cooling, the slag phase is separated from the alloy and both phases are analyzed. A detailed material balance is provided in Table 2.

TABLE 2

| Material balance of the first smelting step | | | | | | | | | | | |
|---|---|---|---|---|---|---|---|---|---|---|---|
| | | | Al (%) | Si (%) | Ca (%) | Mg (%) | Mn (%) | Co (%) | Cu (%) | Ni (%) | Li (%) | C (%) |
| Input | Mass (g) | | | | | | | | | | |
| Starting slag | 500 | 12 | 13 | 15 | 6 | 6 | 0.5 | 0.1 | 0.2 | 3 | — |
| Batteries | 500 | 10 | — | — | — | 4 | 6 | 9 | 4 | 2.5 | 40 |
| Limestone | 175 | — | 2.2 | 38.0 | — | — | — | — | — | — | 11.7 |
| $SiO_2$ | 100 | — | 46.7 | — | — | — | — | — | — | — | — |
| MgO | 50 | — | — | — | 60 | — | — | — | — | — | — |
| Output | Mass (g) | | | | | | | | | | |
| Slag 1 | 890 | 12.3 | 12.9 | 15.9 | 6.7 | 5.6 | 0.6 | 0.1 | 0.2 | 3.1 | — |
| Ni-Co alloy | 95 | 0.0 | 0.0 | 0.0 | 0.0 | 0.2 | 31.4 | 46.4 | 22 | 0.0 | — |
| Yield | Mass (%) | | | | | | | | | | |
| Slag 1 | 90 | 100 | 100 | 100 | 100 | 99.6 | 8 | 3 | 0.5 | 100 | — |
| Ni-Co alloy | 10 | 0 | 0 | 0 | 0 | 0.4 | 92 | 97 | 99.5 | 0 | — |

After the first step, the slag is separated from the crucible and the alloy, crushed and mixed with cokes. 500 grams of the slag is mixed with 30 grams of cokes and melted in a boron nitride coated alumina crucible with a volume of 1 L. A temperature of 1700° C. is maintained using an induction furnace.

An additional amount of 20 grams of cokes is added to the liquid bath. The slag is then allowed to react for 3 hours. After cooling, an alloy-slag phase separation is performed manually whereupon both phases are analyzed. A detailed material balance is provided in Table 3.

From Table 2, it is observed that the Ni—Co alloy has a Si content of less than 0.1% of Si (0.0% is reported) and that it comprises a major part of the Co and Ni (yields of 92 and 99.5% are respectively reported).

The first slag has a $SiO_2/Al_2O_3$ ratio between 0.25 and 2.5 (a ratio of 12.9/12.3 is reported, corresponding to a $SiO_2/Al_2O_3$ ratio of 1.2), and a $SiO_2/CaO$ ratio between 0.5 and 2.5 (a ratio of 12.9/15.9 is reported, corresponding to a $SiO_2/CaO$ ratio of 1.3). It has a MnO content of more than 2.5% (5.6% is reported, corresponding to 7.2% MnO), and an MgO content of more than 5% (6.7% is reported, corresponding to 11.2% MgO). It contains a major part of the Mn (a yield of 99.6% is reported).

TABLE 3

| | | Al (%) | Si (%) | Ca (%) | Mg (%) | Mn (%) | Co (%) | Cu (%) | Ni (%) | Li (%) |
|---|---|---|---|---|---|---|---|---|---|---|
| Input | Mass (g) | | | | | | | | | |
| Slag 1 | 500 | 12.3 | 12.9 | 15.9 | 6.7 | 5.6 | 0.6 | 0.1 | 0.2 | 3.1 |
| Output | Mass (g) | | | | | | | | | |
| Slag 2 | 438 | 14.5 | 12.8 | 18.4 | 7.8 | 0.5 | 0 | 0 | 0 | 1.9 |
| Si-Mn alloy | 46 | 0 | 23.7 | 0 | 0 | 65.8 | 6.4 | 1.2 | 2.6 | 0 |
| Yield | Mass (%) | | | | | | | | | |
| Slag 2 | 90.6 | 100 | 35.1 | 100 | 100 | 0.8 | 0 | 0 | 0 | 100 |
| Si-Mn alloy | 9.4 | 0 | 64.9 | 0 | 0 | 99.2 | 100 | 100 | 100 | 0 |

Table 3 shows that the Si—Mn alloy has a Si content of more than 10% (23.7% is reported), and that it comprises a major part of the Mn (a yield of 99.2% is reported).

The invention claimed is:

1. Process for the production of Si—Mn alloy from materials containing Ni, Mn and Co, comprising the steps:
   a) preparing a metallurgical charge comprising said materials, and Si, Al, Ca, and Mg as slag formers;
   b) smelting the charge in first reducing conditions, thereby obtaining a Ni-Co alloy and a first slag, wherein the Ni-Co alloy comprises a major part of at least one of Co and Ni and has a Si content <0.1 wt %, and wherein the first slag comprises a major part of the Mn;
   c) separation of the first slag from the Ni-Co alloy; and
   d) smelting the first slag in second reducing conditions, more reducing than said first reducing conditions, thereby obtaining a Si-Mn alloy and a second slag, wherein the Si-Mn alloy comprises a major part of the Mn and has a Si content >10 wt %.

2. Process according to claim 1, wherein the first slag has a composition according to:
   $0.25 < SiO_2/Al_2O_3 < 2.5$;
   $0.5 < SiO_2/CaO < 2.5$;
   $MnO > 2.5$ wt %;
   $MgO > 5$ wt %; and,
   $Co+Ni > 0.1$ wt %.

3. Process according to claim 1, further comprising the step of adding the Si—Mn alloy to an Fe-based molten phase, thereby obtaining Si—Mn steel.

* * * * *